US012781317B2

(12) United States Patent
Bratton et al.

(10) Patent No.: US 12,781,317 B2
(45) Date of Patent: Nov. 3, 2026

(54) MODIFIED CAST METAL OBJECT

(71) Applicant: Armadillo Metal Coatings Ltd, Blackpool (GB)

(72) Inventors: Graham Bratton, Sidcup (GB); Gerard Ronan, Suckley (GB); Alex Nielsen, Blackpool (GB)

(73) Assignee: Armadillo Metal Coatings Ltd, Blackpool (GB)

( * ) Notice: Subject to any disclaimer, the term of this patent is extended or adjusted under 35 U.S.C. 154(b) by 262 days.

(21) Appl. No.: 18/567,913

(22) PCT Filed: Jun. 9, 2022

(86) PCT No.: PCT/EP2022/065764
§ 371 (c)(1),
(2) Date: Dec. 7, 2023

(87) PCT Pub. No.: WO2022/258783
PCT Pub. Date: Dec. 15, 2022

(65) Prior Publication Data

US 2024/0268391 A1 Aug. 15, 2024

(30) Foreign Application Priority Data

Jun. 10, 2021 (GB) ...................................... 2108337

(51) Int. Cl.

| | |
|---|---|
| ***C22C 32/00*** | (2006.01) |
| ***A01N 59/06*** | (2006.01) |
| ***A01N 59/16*** | (2006.01) |
| ***A01N 59/20*** | (2006.01) |
| ***A01P 1/00*** | (2006.01) |
| ***B22D 1/00*** | (2006.01) |
| ***B22D 7/00*** | (2006.01) |
| ***C22C 1/10*** | (2023.01) |
| ***C22C 5/06*** | (2006.01) |
| ***C22C 38/00*** | (2006.01) |

(52) U.S. Cl.
CPC .......... *C22C 32/0089* (2013.01); *A01N 59/06* (2013.01); *A01N 59/16* (2013.01); *A01N 59/20* (2013.01); *A01P 1/00* (2021.08); *B22D 1/00* (2013.01); *B22D 7/005* (2013.01); *C22C 1/1047* (2023.01); *C22C 5/06* (2013.01); *C22C 38/00* (2013.01)

(58) Field of Classification Search
None
See application file for complete search history.

(56) References Cited

U.S. PATENT DOCUMENTS

| | | | | |
|---|---|---|---|---|
| 3,861,906 | A | 1/1975 | Tipnis et al. | |
| 6,200,527 | B1 | 3/2001 | Damie et al. | |
| 2021/0108293 | A1 * | 4/2021 | Kuramoto ............ | C21D 8/0226 |

FOREIGN PATENT DOCUMENTS

| | | | |
|---|---|---|---|
| CN | 105154722 | A | 12/2015 |
| CN | 105177371 | A | 12/2015 |
| CN | 106193932 | A | 12/2016 |
| CN | 110629123 | A | 12/2019 |
| CN | 111690840 | A | 9/2020 |
| GB | 2596330 | * | 5/2025 |
| PL | 217093 | * | 6/2014 |

OTHER PUBLICATIONS

Ye (CN 105154722; published: Dec. 16, 2015; in IDS dated Dec. 7, 2023); English machine translation obtained on Jan. 22, 2026. (Year: 2026).*

Dobrzański et al. (PL 217093; published: Jun. 30, 2014); English machine translation obtained on Jan. 21, 2026. (Year: 2026).*

European Steel and Alloy Grades/Numbers ("ENAC-AlSi9", published: Apr. 23, 2015 via Wayback Machine); English machine translation obtained on Jan. 21, 2026. (Year: 2026).*

International Search Report and Written Opinion in PCT/EP2022/065764, mailed Sep. 13, 2022, 15 pages.

* cited by examiner

*Primary Examiner* — Genevieve S Alley
(74) *Attorney, Agent, or Firm* — ARENTFOX SCHIFF LLP

(57) ABSTRACT

The invention relates to a device, specifically a cast metal object, composed of one or more metals with an additive, such as an aluminate, silicate, or aluminosilicate, dispersed throughout. The additive may be a halloysite nanotube or kaolinite, and may be present in amounts between 0.1 to 10 wt. % relative to the object's total weight. The metal may vary, with options including copper, iron, steel, and their respective alloys. Additionally, a method for generating the cast metal object is provided. The method may provide for preparing a molten material with the metal and additive, pouring this into a casting mold, and cooling it to form the object. The resulting device may be utilized to decrease the transmission of diseases by reducing microbial contamination on touch surfaces. The method may applicable to communicable diseases resulting from viral or bacterial infections, such as coronaviruses or antibiotic-resistant bacteria.

6 Claims, No Drawings

MODIFIED CAST METAL OBJECT

CROSS-REFERENCE TO RELATED APPLICATIONS

This application is a National Phase of PCT/EP2022/065764, filed on Jun. 9, 2022, which claims priority to GB Patent Application No. 2108337.3, filed on Jun. 10, 2021, the disclosures of each of which are hereby incorporated by reference in their entireties.

The present invention relates generally to corrosion resistant and/or antimicrobial cast metals. In particular, the invention provides metallic objects that are prepared by casting a precursor liquid comprising one or more molten metals and an aluminate, silicate or aluminosilicate additive; and processes for preparing such modified cast metal objects. Also provided are methods for inhibiting the transmission of communicable diseases by preparing touch surfaces from such modified cast metal objects; and to the use of such modified cast metal objects as an antimicrobial touch surface to inhibit the transmission of communicable diseases.

INTRODUCTION

Corrosion, which can degrade many properties of a material (e.g. appearance, strength and permeability to liquids and/or gases), is a gradual chemical and/or electrochemical process that converts a refined metal into a more chemically stable form (e.g. oxide, hydroxide or sulfoxide) upon exposure to oxidant(s) present in the surrounding environment. Indeed, many metals and alloys corrode merely from exposure to moisture present in air, but corrosion processes can be strongly affected by exposure to certain oxidants. Further, as corrosion is a diffusion-controlled process, it occurs on exposed surfaces. As a result, methods to reduce the activity of exposed surfaces can increase the corrosion resistance of metal substrates. Rusting, i.e. the formation of iron oxides, is the best-known example of corrosion and produces oxide (s) or salt(s) of the original metal resulting in a distinctive orange colouration of the metal. Tarnishing is another well-known example of corrosion, in which the outermost layers of a variety of metals and alloys (e.g. silver, gold, copper, brass, aluminium) undergo a chemical reaction upon exposure to everyday atmospheric conditions resulting in the formation of a thin layer of corrosion known as tarnish. Tarnish typically appears as a dull, grey or black film or coating over metal and, unlike rust, is a self-limiting surface phenomenon (i.e. only the top few layers of the metal react and the layer of tarnish seals and protects the underlying layers from further reaction).

Corrosion is costly to industry; this is supported by a study conducted by the U.S. Federal Highway Administration (FHWA) in 2002, in which it was found that the annual direct cost of corrosion was $276 billion—accounting for ca 3.1% of the Gross Domestic Product (GDP) (1). Unfortunately the process of corrosion is thermodynamically favourable and so inhibitory measures must be considered and implemented to control unnecessary losses. Electroplating is often used to metallically coat substrate metal, like mild steel. This can be done to functionalise the surface—controlling thermal, electrical or corrosive properties of the part, while keeping costs down. However, such plating only provides a thin functional coating that is relatively weakly adhered to the bulk metal, and so is both susceptible to failure and precludes further processing (e.g. cutting or polishing) of the substrate metal as doing so would expose uncoated bulk metal that would then undergo accelerated corrosion.

Furthermore, many frequent touch surfaces, especially those found in public spaces such as those found in healthcare, catering and/or retail environments and education, sports and/or entertainment facilities, are prepared from metals as such surfaces are hardwearing and relatively easy to clean. However, it is well known that many pathogenic microbes, including but not limited to pathogen viruses such as the Covid-19 causing SARS-CoV-2, can be transmitted between individuals via contact with frequent touch surfaces, including metal surfaces. Therefore, given the potential for cross contamination between such touch surfaces and the population to contribute to the transmission of various communicable diseases, there is a clear need to reduce, the persistence time (i.e. the length of time that microbes survive following deposition) of pathogenic microbes on inanimate surfaces to inhibit the transmission of communicable diseases.

Various studies have assessed the persistence of coronavirus particles, including SARS-CoV-1 (the infective agent in Severe Acute Respiratory Syndrome), MERS-CoV (the infective agent in Middle East Respiratory Syndrome) and SAS-CoV-2, and it has been shown that such coronavirus particles can persist on inanimate metallic surfaces such as metals for over a week. However, viral particles may be efficiently inactivated by surface disinfection procedures.

It is known that surfaces of various metals, in particular copper and alloys such as brass and bronze, exhibit antimicrobial properties and possess an inherent ability to kill a wide range of harmful microbes relatively rapidly and with a high degree of efficacy. This antimicrobial activity is attributed to the oligodynamic effect, via which metal ions impart a toxic effect (by reactive with thiol or amine groups of proteins) on living cells including algae, molds, spores, fungi, viruses and bacteria, even when present in low concentrations. Whilst this antimicrobial effect is predominantly associated with copper, it is also shown by other metal including silver, zinc and aluminium.

Thus, metallic touch surfaces may be provided to reduce microbial persistence and the associated transmission of communicable diseases. For example, for touch surfaces made with copper or a copper alloy, the transmission of disease-causing organisms can be significantly reduced, decreasing the frequency of patient infections in care sites such as hospital intensive care units.

However, there remains a need to enhance this known antimicrobial effect, thereby further reducing microbial persistence and thus transmission of communicable diseases.

Therefore, it is an object of the present invention to provide a corrosion resistant and/or antimicrobial cast metal that can be used to form a variety of metal products, including metallic touch points such as door handles, handrails etc to provide an enhanced antimicrobial effect and so reduce the transmission of communicable diseases.

The applicant of the present disclosure has not only found that it is possible to cast metal objects comprising a bulk metal having dispersed throughout one or more aluminate, silicate or aluminosilicate additives, but surprisingly that the resultant cast metal per se demonstrates enhanced corrosion resistance and/or antimicrobial activity, negating the need to provide a sacrificial coating to achieve such properties.

Furthermore, the dispersal of said one or more additive may enhance the mechanical properties (e.g. one or more of fatigue performance, toughness, hardness and tensile strength) of the cast bulk metal.

STATEMENT OF THE INVENTION

The present invention, in its various aspects, is as set out in the accompanying claims.

According to a first aspect of the invention there is provided a cast metal object comprising one or more metals having dispersed throughout an additive selected from an aluminate, silicate or aluminosilicate material.

The dispersion of such additives throughout the bulk metal casting has been found to impart multiple beneficial properties to cast metal objects. Notably, the additive enhances corrosion resistance of the metal object. Further, the additive imparts resistance to microbial contamination, and so can reduce the transmission of communicable diseases by surface transmission by inhibiting the growth and/or reducing the persistence time (i.e. the duration that deposited microbes can survive) of pathogenic microbes on cast metal objects. In addition, the additive may enhance one or more mechanical properties (e.g. fatigue performance, toughness, hardness and/or tensile strength) of the cast bulk metal.

The term 'communicable diseases' refers, in the context of this application, to any disease or disorder caused by a pathogenic infectious agent that can be transferred between humans by indirect contact transmission, i.e. where no direct human-to human contact is required. Such diseases or disorders can be spread when an infected person sneezes or coughs, sending infectious droplets into the air which may then land, and persist for a significant length of time, on touch surfaces/objects which are subsequently contacted by healthy individuals, eventually leading to transfer of infectious particles to the eyes, nose and/or mouth via said individuals hands. Communicable diseases include, but are not limited to viral infections, including coronavirus (e.g. SAS-CoV-2, SARS-CoV-1 or MERS-CoV) and norovirus infections, or bacterial infections, including antibiotic resistant bacterial infections e.g. Methicillin-resistant *Staphylococcus aureus* (MRSA).

The terms 'antimicrobial' and 'microbicidal' are in the context of this application interchangeable and include within their scope any antiviral, antibacterial and/or antifungal activity. In preferred embodiments, the term 'antimicrobial' refers specifically to an antiviral activity. Similarly, in preferred embodiments the term 'microbial' refers specifically to 'viral'.

In preferred embodiments of the invention said additive is a halloysite nanotube. Halloysite is a naturally occurring two-layered aluminosilicate clay with a hollow tubular structure in the submicrometer range. It has the empirical formula:

$$(Al_2Si_2)_5(OH)_4 \cdot nH_2O)$$

where n is 0-2.

In the present invention, the halloysite is typically a dehydrated halloysite in which n=0.

The outer tube of a halloysite has properties similar to those of $SiO_2$, while the inner tube has properties similar to $Al_2O_3$ (3).

Typically, halloysites are between 0.5-15 μm, more usually 1-15 μm in length and have an internal diameter of about 5-20 nm, more usually about 15 nm and an external diameter of about 10-150 nm, more usually about 50 nm.

In alternative, equally preferred, embodiments of the invention said additive is kaolinite. Kaolin is a naturally occurring clay mineral with the chemical composition $Al_2Si_2O_5(OH_4)$. It is a layered aluminosilicate material comprising a tetrahedral sheet of silica ($SiO_4$) linked through oxygen atoms to an octahedral sheet of alumina ($AlO_6$).

As noted above, the dispersion of such additives throughout the cast metal has been found to impart corrosion resistance and/or significantly enhance resistance to microbial contamination, and so can be provided within a cast metal object, e.g. a touch surface, to reduce the transmission of communicable diseases by microbial contamination by inhibiting the growth and/or reducing the persistence time of pathogenic microbes.

Touch surfaces, also known as high-touch surfaces, are numerous and varied in size and shape, and are found throughout healthcare (e.g. hospitals, out-patient clinics, dental surgeries and care home) facilities, education and sport facilities, catering (e.g. restaurants and food preparation facilities) and public (e.g. museums, parks, public conveniences, train and bus stations) spaces. Exemplary touch surfaces known to contribute to the transmission of communicable diseases, particularly in the healthcare environment, include ward furniture & fittings; doorknobs and handles; door push plates; power-assisted doors push plates; switches; light pulls; lift buttons and handrails. All such surfaces can be provided in cast metal form as set out above, thereby reducing disease transmission by inhibiting growth and/or reducing persistence time of pathogenic microbes.

As a consequence of the enhanced antimicrobial effect attributable to the cast bulk metal, corrosion and/or microbial growth can be inhibited without incorporating additional corrosion resistant and/or antimicrobial agents to the metal object in the form of, e.g. coatings or paints. Therefore, in preferred embodiments, cast metal object of the invention does not include any antimicrobial and/or corrosion resistant coatings. Preferably, the cast metal object consists essentially of said one or more metal(s) and said additive. In this context, the term 'consists essentially of' means that said one or more metal(s) and said additive comprise at least 90%, preferably at least 95%, and still more preferably at least 99% by weight of the cast metal object. In exemplary embodiments, the cast metal object consists solely of said one or more metal(s) and said additive.

Suitably, the additive is present in an amount from about 0.1 to 10 wt. %, more suitably from about 0.5 to 5 wt. %, and still more suitably from about 1 to 3 wt. % with respect to the total weight of said metal object.

In one embodiment, the cast metal object comprises 1 wt. % of said additive, preferably halloysite nanotubes.

In an embodiment of the invention the cast metal object comprises a metal selected from the group consisting of copper, iron, steel, mild steel, zinc, silver, gold, platinum, tin, aluminium and alloys thereof. More preferably, the metal is selected from steel, silver, copper and aluminium. Even more preferably the metal is selected from steel or copper.

In a further preferred embodiment of the invention said metal is a steel, silver, copper or aluminium alloy, more preferably a steel, silver or copper alloy, and wherein said alloy further comprises one or more metal selected from copper, magnesium, manganese, silicon, tin, nickel, silver, gold, germanium and zinc. An exemplary example of such an alloy is Argentium Silver, which comprises silver, copper and germanium.

In a preferred embodiment of the invention said cast metal object is at least 1 mm thick, more preferably at least 5 mm thick, more preferably at least from about 10 mm, still more preferably at least 25 mm and even more preferably at least 50 mm thick. As the additive is dispersed throughout the cast metal object, advantageous anticorrosion and/or antimicrobial properties apply uniformly to the entirety of the bulk metal, irrespective of thickness, as opposed to applying only to surface as is the case when anti-corrosion and/or antimicrobial additives are applied as coatings to bulk metals.

As such, uniform corrosion resistant and/or antimicrobial metal ingots of significantly greater thickness (e.g. 500 mm) can be prepared in accordance with the invention. According to a second aspect of the invention there is provided a process for manufacturing a cast metal object according to the first aspect of the invention, the process comprising the following steps:

i) preparing a molten material comprising said one or more metals;
ii) dispersing said additive within said molten material to produce a precursor liquid;
iii) pouring said precursor liquid into a casting mold;
iv) solidifying said precursor liquid in the casting mold by cooling to prepare a cast metal object; and
v) removing said cast metal object from said casting mold.

As would be readily appreciated, the additive should be uniformly dispersed throughout the molten material to provide consistent anticorrosion and/or antimicrobial efficacy throughout the bulk metal. Therefore, in preferred embodiments, step ii) and/or step iii) further comprises stirring or agitating said precursor liquid, which serves to break up aggregates and to ensure an even dispersal of said additives in the precursor liquid prior to cooling.

In a preferred process of the invention said precursor liquid is agitated for about 1 to 20 min prior to pouring into said casting mold for cooling. More preferably, said precursor liquid is agitated for at least 4 minutes, or, in ascending order of preference, at least 5, 6, 7, 8, 9 or 10 minutes, for example 4-20, 5-20, 6-20, 7-20, 8-20, 9-20 or 10-20 minutes, for example about 15 minutes. As would be appreciated by the skilled person, agitation can be achieved by any number of conventional processes including, but not limited to stirring, gas bubble agitation and/or convective mixing.

Preferably, the cast metal object is prepared by vacuum induced melting (VIM). Preferred features relating to the metals and/or additives are as described above for the first aspect of the invention.

The process of the invention is advantageous as it has enabled the inventor to produce cast metal objects throughout which an aluminate, silicate or aluminosilicate additive is uniformly dispersed into the metallic surface coating layer. The provision of such an additive throughout the bulk metal was found to impart excellent corrosion resistance and microbicidal activity to the bulk metal, with these effects removing the need to add anticorrosion and or antimicrobial agents as surface coatings to metal objects.

According to a third aspect of the invention there is provided a cast metal object prepared according to the process of the second aspect of the invention.

According to a fourth aspect of the invention, there is provided a method for inhibiting the transmission of communicable diseases by microbial contamination of touch surfaces, said method comprising forming said touch surface from a cast metal object according to the first or third aspect of the present invention.

In preferred embodiments, said communicable disease is caused by a viral infection, preferably a coronavirus (e.g. SAS-CoV-2. SARS-CoV-1 or MERS-CoV) or norovirus infection. In alternative preferred embodiments, said communicable disease is caused by a bacterial infection, preferably an antibiotic resistant bacterial infection (e.g. Methicillin-resistant *Staphylococcus aureus* (MRSA)).

According to a fifth aspect of the invention, provided is the use of an aluminate, silicate or aluminosilicate material as an additive within a cast metal touch surface for inhibiting the transmission of communicable diseases by microbial contamination of touch surface.

In preferred embodiments, said communicable disease is caused by a viral infection, preferably a coronavirus (e.g. SAS-CoV-2. SARS-CoV-1 or MERS-CoV) or norovirus infection. In alternative preferred embodiments, said communicable disease is caused by a bacterial infection, preferably an antibiotic resistant bacterial infection (e.g. Methicillin-resistant *Staphylococcus aureus* (MRSA)).

In all preferred methods and/or uses of the invention, preferred features relating to the metals and/or additives are as described above for the first aspect of the invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

All references, including any patent or patent application, cited in this specification are hereby incorporated by reference. No admission is made that any reference constitutes prior art. Further, no admission is made that any of the prior art constitutes common general knowledge.

Preferred features of each aspect of the invention may be as described in connection with any other aspect, unless incompatible therewith.

The invention will now be further described in the Figures and Examples below.

EXAMPLES

Example 1: Preparation of Cast Metal Samples

Materials

Aluminosilicate (halloysite) additive was purchased from Sigma Aldrich Ltd.

Methods

Additive free and aluminosilicate containing cast silver and steel ingots were prepared by conventional vacuum induced melting (VIM) at the Steel and Metals Institute at Swansea University. In summary, bulk metal and, where required, halloysite additive (1 wt. %, based on the total weight of the bulk metal), are placed in in a core-less induction furnace (100 mm wide by 500 mm high, leaving around 60-80 mm void space at top of the furnace), wherein eddy currents are induced within the furnace to melt the bulk metal under vacuum pressure. In addition to melting the bulk metal, induced eddy currents also provide an agitating effect, and so ensure an even dispersal of halloysite additive throughout the molten bulk metal prior to ingot formation upon cooling. The ingot solidification process occurs following pouring of the molten material, by initially cooling for 40-50 mins prior to releasing the vacuum and leaving to cool for a further 3 to 4 hours before the cast metal ingot is removed.

Each steel ingot was formed from 28 kg of bulk metal and, for additive containing samples, 280 g of aluminosilicate (halloysite nanotube) was added (1 wt. %), based on bulk metal weight.

Table 1 outlines the specimens produced.

TABLE 1

| Specimen | Substrate | Additive (1 wt. %) |
|---|---|---|
| 1 | Steel | None |
| 2 | Steel | Halloysite |
| 3 | Silver | None |
| 4 | Silver | Halloysite |

Results

In all cases, a bright and uniform metal ingot was produced, demonstrating that aluminosilicate additives can be incorporated throughout bulk metal castings without negatively influencing the appearance of the casting.

Example 2: Antimicrobial Efficacy Testing

The antimicrobial efficacy of cast metals comprising aluminosilicate additives was assessed by measuring the viral persistence levels on metal ingots of specimens 1 to 4 prepared in Example 1 above 1 or 4 hours after contact with a known titration (approximately $1\times10^7$ PFU/100 μl) of SARS-CoV-2, the causative infectious agent of Covid-19.

Methods

Sars-CoV-2 Plaque Assay

As the skilled reader would readily appreciate, a plaque assay represents a standard method to determine virus concentration in terms of infectious doses. In particular, viral plaque assays determine the number of plaque forming units (PFU) in a virus sample, which is a measure of virus quantity. A standard SARS-CoV-2 plaque assay used to quantify SARS-CoV-2 levels is as follows:

i. VeroE6-ACE2-TMPRSS cells are seeded into 12-well plates at $2\times10^5$/well, in 10% Dulbecco's Modified Eagle Medium (DMEM);
ii. SARS-CoV2 logarithmic dilutions are prepared; ii.
iii. Media is removed, and 50 μl of 2% DMEM is then added to each well. 100 μl/well of virus inoculum is then added to each well before incubation for 1 hour at 37° C. with rocking to allow virus adsorption.
iv. An overlay medium is then prepared by mixing Avicel™ binder with 2× Minimal Essential Medium™/4% foetal Calf Serum at ratio 1:1;
v. After 1 hour virus adsorption, inoculum is removed and replaced with 1 ml of overlay medium per well and the plate is then incubated for 3 days at 37° C.;
vi. Overlay medium is removed, and well is washed once in phosphate buffered saline;
vii. 2 ml ice cold methanol is added for 5 min to fix;
viii. 1 ml crystal violet stain is added and left for 5 min before removal and washing with water; and
ix. Plaques are manually counted to calculate, in combination with the required dilution factor, PFU/sample volume.

Sars-CoV-2 Persistence on Additive Containing and Additive Free Cast Metal Objects Viral persistence on additive containing and additive fee cast metal objects was monitored by simple adaptation of the plaque assay detailed above. In particular, the following standard process was followed:

i. A small test piece of the test materials, i.e. additive containing or additive free bulk metal specimens 1-4 are placed into the bottom of a 6-well dish (well diameter 34.6 mm);
ii. A specific volume (100 μl) of a known concentration (approx. $10^7$ CFU/ml) of Sars-CoV-2 is then added to the surface of each test sample. If the liquid does not bead, then a cell spreader is used to create a thinner film;
iii. Wait for an appropriate test contact period (1 hour or 4 hour) before adding 1 ml of 10% DMEM to each well and gently pipetting the liquid against the surface of the test substrates to recover virus; and
iv. Collect the 10% DMEM samples and perform a series of logarithmic dilutions for use in step (ii) of above plaque assay to calculate, in combination with the required dilution factor, PFU/test sample.

Results

As expected, significant levels of SARS-CoV-2 persist on the surface of the additive free cast steel test samples (Table 1, Specimen 1). However, the dispersal of an aluminosilicate additive, in this case a halloysite, throughout the bulk steel casting (Table 1, Specimen 2) can reduce the duration of viral persistence on the steel surface. Therefore, aluminosilicate additive(s) may be included within steel castings to reduce the risk of infection by indirect contact transmission from cast steel objects.

A similar decrease in viral persistence can be observed for cast silver specimens upon dispersal of an aluminosilicate throughout the bulk silver casting (Table 1, Specimens 3 and 4). Therefore, aluminosilicate additive(s) may also be included within silver castings to reduce the risk of infection by indirect contact transmission from cast silver objects. It is expected that this increased antimicrobial activity will extend to other aluminosilicate additive containing bulk metal castings.

Example 3: Corrosion Testing

Methods

The resistance to corrosion was assessed using small test pieces removed from four test specimens—additive free cast steel [Table 1, Specimen 1], aluminosilicate containing cast steel [Table 1, Specimen 2], additive free cast silver [Table 1, Specimen 3], and aluminosilicate containing cast silver [Table 1, Specimen 4].

Each of the cast steel and silver test specimens were subjected to humidity testing which involved enclosing the specimens in a holding space with relative humidity of 95% at 40° ° C. for extended duration tests.

In addition, the tarnish/corrosion resistance of each of the test specimens were assessed using the International Standard Thioacetamide corrosion Test (TAA test—ISO 4538-1978). In summary, said testing involved exposure of the test specimens to vapours emitted by thioacetamide in an atmosphere having a relative humidity of 75%, maintained by the presence of a saturated solution of sodium acetate.

Results

As expected, significant corrosion/tarnishing was observed on the surface of the additive free cast steel test samples (Table 1, Specimen 1) following completion of humidity test and/or the TAA test. However, the dispersal of an aluminosilicate additive, in this case a halloysite, throughout the bulk steel casting (Table 1, Specimen 2) can significantly reduce the rate of observed corrosion/tarnish. Therefore, aluminosilicate additive(s) may be included within steel castings to provide corrosion resistant cast steel objects.

A similar surprising decrease in tarnishing can be observed for cast silver specimens, upon dispersal of an aluminosilicate throughout the bulk silver casting (Table 1, Specimens 3 and 4). Therefore, aluminosilicate additive(s) may also be included within silver castings to provide tarnish resistant cast silver objects.

It is expected that such corrosion/tarnish resistance will extend to other aluminosilicate additive containing bulk metal castings.

Example 4: Mechanical Testing

Methods

The mechanical properties of cast metals comprising aluminosilicate additives was assessed and compared to additive free cast metals by comparing one or more of fatigue strength, impact resistance, hardness and (tensile) strength for (i) a test piece obtained from an additive free steel ingot (Table 1, Specimen 1) with a test piece obtained from an aluminosilicate containing steel ingot (Table 1, Specimen 2); or (ii) a test piece obtained from an additive free silver ingot (Table 1, Specimen 3) with a test piece obtained from an aluminosilicate containing silver ingot (Table 1, Specimen 4).

Results

It is expected that the dispersal of aluminosilicate additive throughout the bulk metal casting will enhance one or more of the abovementioned mechanical properties, both for steel and silver castings.

REFERENCES

1. Gerhardus H. Koch M P H, Brongers and NGTYPVJHP. Corrosion costs and preventive strategies in the United States. Summ Shute Inst [Internet]. 2002; 1-12. Available from: papers2://publication/uuid/4D469A9D-07D6-4543-B217-3A15873793CF

The invention claimed is:

1. A cast metal object comprising:

one or more metals having dispersed throughout an additive selected from an aluminate, silicate or aluminosilicate material, wherein said one or more metals is a steel, silver or copper alloy, and wherein said additive is a halloysite nanotube of formula $(Al_2Si_2)_5\ (OH)_4 \cdot nH_2O)$, where n is 0-2.

2. The cast metal object according to claim 1, wherein said additive is present in an amount from about 0.1 to 10 wt. % with respect to a total weight of said metal object.

3. The cast metal object according to claim 1, wherein said alloy further comprises one or more further metals selected from the group consisting of copper, magnesium, manganese, silicon, tin, nickel, silver, gold, germanium and zinc.

4. The cast metal object according to claim 1, wherein said object is at least 1 mm thick.

5. A process for manufacturing the cast metal object according to claim 1, wherein said process comprising steps:

i) preparing a molten material comprising said one or more metals;

ii) dispersing said additive within said molten material to produce a precursor liquid;

iii) pouring said precursor liquid into a casting mold;

iv) solidifying the precursor liquid in the casting mold by cooling to prepare a cast metal object; and v) removing said cast metal object from said casting mold.

6. The process according to claim 5, wherein step ii) and/or step iii) further comprises stirring or agitating said precursor liquid.

* * * * *